United States Patent [19]

Reuter et al.

[11] Patent Number: 5,045,036
[45] Date of Patent: Sep. 3, 1991

[54] ELECTROMAGNETIC SPEED CHANGE APPARATUS

[75] Inventors: David C. Reuter, Fort Wayne, Ind.; Paul A. Larson, Belvidere, Ill.

[73] Assignee: Dana Corporation, Toledo, Ohio

[21] Appl. No.: 626,126

[22] Filed: Dec. 11, 1990

[51] Int. Cl.⁵ ............................................. F16H 37/06
[52] U.S. Cl. .................................... 475/149; 475/269; 192/84 C
[58] Field of Search ............... 475/149, 151, 269, 296; 192/3.56, 84 A, 84 C

[56] References Cited

U.S. PATENT DOCUMENTS

| | | | |
|---|---|---|---|
| 3,507,374 | 4/1970 | Allaben, Jr. | 192/84 |
| 4,337,855 | 7/1982 | Bennett | 192/84 A |
| 4,561,520 | 12/1985 | Fogelberg | 180/247 |
| 4,566,575 | 1/1986 | Sekella | 192/84 C |
| 4,587,861 | 5/1986 | Morishita | 475/149 X |
| 4,632,207 | 12/1986 | Moore | 180/247 |
| 4,770,280 | 7/1988 | Frost | 192/53 F |
| 4,878,399 | 11/1989 | Kameda | 475/269 |
| 4,929,858 | 5/1990 | Konishi | 192/84 A X |
| 4,938,738 | 7/1990 | Fuelberth et al. | 475/269 X |

Primary Examiner—Allan D. Herrmann
Assistant Examiner—William O. Trousdell
Attorney, Agent, or Firm—F. B. McDonald

[57] ABSTRACT

An electromagnetic speed change apparatus is effective to shift a sleeve from a first speed position to a second against the bias of a spring. In a preferred form, the apparatus includes an armature fixed to a shifting sleeve for rotation and axial movement therewith, one end of the shifting sleeve splined to an output shaft, the opposite end of the shifting sleeve selectively engagable with an internally splined aperture positioned in one end of an input shaft or with an internally splined carrier aperture axially spaced from the input shaft end. The shifting sleeve has a minor diameter portion and a major portion larger than the minor portion. The major portion is piloted by a support member disposed in the end of the input shaft. In a preferred form, a neck bridges the major and minor diameter portions of the sleeve, and provides a limit to axial movement of the shifting sleeve whenever the neck comes into contact with the support member. Finally, in the preferred form, the biasing force of the spring is effective to cause the shifting sleeve to move to a fail-safe gear position upon failure of electromagnetic actuation.

10 Claims, 1 Drawing Sheet

ELECTROMAGNETIC SPEED CHANGE APPARATUS

BACKGROUND OF INVENTION

This invention relates generally to mechanisms for changing transfer case speeds in four-wheel drive vehicles. More particularly, the invention relates to the axial translation of a shifter sleeve between high and low speed range positions without requirement of mechanical actuation by a shift fork.

A majority of transfer cases provide a mechanism whereby a vehicle may be converted from a two-wheel to a four-wheel drive mode for purposes of enhancing driveability on off-highway surfaces, as well as on-highway surfaces under inclement conditions. In addition, most transfer cases provide a means for shifting between high and low speed range positions. In such cases, the high range represents a general purpose normal use; the low range is selected for operations in which either more power is required and/or the vehicle is to be operated at slower speeds.

Prior art range speed gears have been shifted between high and low positions by conventional shift forks. Thus, it has been necessary to employ shifter sleeves having mechanical shift forks attached to the sleeves for achieving axial translation of the sleeve between high and low range gear positions.

SUMMARY OF THE INVENTION

This invention provides an entirely "forkless" shift apparatus capable of shifting a gearbox such as a transfer case between two gear positions without reliance upon conventional mechanical shift linkage. In a preferred form, an electromagnetic gear shifting apparatus employs a shifting sleeve splined to an output shaft at one end, and having splines at its opposite end for achieving selective engagement of either a first or a second speed range position. Fixedly mounted about the shifting sleeve is an armature mounted proximally to an electromagnet contained within a field shell. The sleeve is normally biased by a spring into a high speed range position, and is axially translated to a low speed range position against a spring biasing force upon energization of the electromagnet. Electromagnetic flux travels a path which includes a gap between pole rings of the armature and the field shell.

In a preferred embodiment, the shifting sleeve is formed with a minor diameter portion and a larger, major, diameter portion, the two portions having a radially inwardly formed curved neck between them. The major diameter portion of the sleeve is piloted within an end of a rotary input shaft by a conical support member. The support member defines an apex adapted for symmetrical support of the major sleeve portion within an end of the input shaft, while a circular base of the support member is adapted for engaging the neck of the sleeve to provide a limit to axial movement of the sleeve. Also in a preferred form, the armature is press-fitted over the sleeve with its inner pole ring resting against the neck of the sleeve.

DESCRIPTION OF A PREFERRED EMBODIMENT

Figure 1:
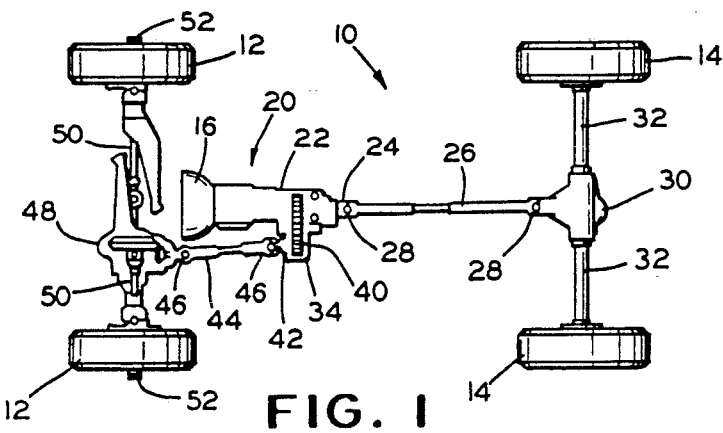
FIG. 1 is a plan view of a driveline system of a four-wheel drive vehicle, which includes a transfer case containing the electromagnetic gear shifting apparatus of the present invention.

Referring initially to FIG. 1, a driveline system 10 is shown in elementary form as employed in a four-wheel drive vehicle. The system utilizes sets of front wheels 12 and rear wheels 14. A transfer case 20 is affixed to the rear end of a transmission 16, which may be automatic or manual, the transmission 16 functioning as the primary vehicular gearbox.

Figure 2:
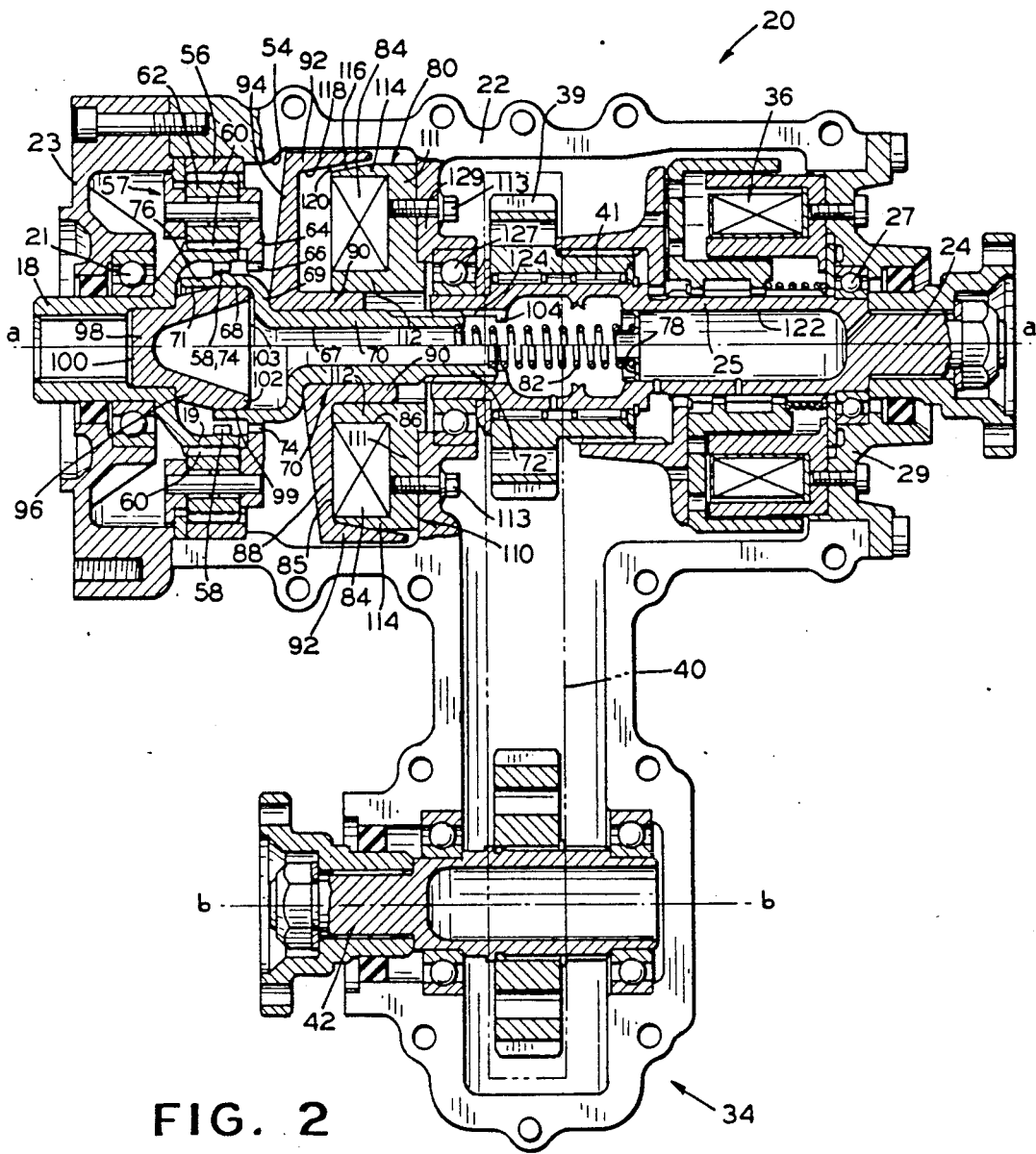
FIG. 2 is a cross-sectional plan view of the transfer case depicted in FIG. 1, wherein the gear shifting apparatus is depicted as energized (shown in the low speed range position) in that portion of the drawing figure below an axis "a—a", and depicted as de-energized (shown in the high speed range position) in that portion of the drawing figure above the same axis.

Referring now also to FIG. 2, a transmission input shaft 18 having an axis "a—a" includes an end 19 journaled in bearings 21 in a first end wall 23 of the transfer case housing 22. The transfer case 20 functions as an auxiliary or secondary gearbox in the driveline system 10. Extending rearwardly outwardly of the housing 22 is a full-time primary output shaft 24 which shares the axis "a—a", and which has a shaft end 25 journaled in bearings 27 disposed in a second end wall 29. The end 25 is also journaled in a second set of bearings 127 positioned in an internal wall 129 for additional support. A rear differential 30 is coupled to the primary output shaft 24 through a set of the Cardan joints 28 and a rear output shaft 26. Coupled to the rear differential are rear axle shafts 32 which drivingly engage the rear wheels 14.

An auxiliary power portion 34 of the transfer case 20 contains an auxiliary output shaft 42 positioned along an axis "b—b" parallel to axis "a—a" of the input and output shafts 18 and 24, respectively. A sprocket 39 is mounted on a set of bearings 41 for rotatable disposition about the journaled end 25 of the output shaft 24. The sprocket is coupled via chain drive 40 to the auxiliary shaft 42, which in turn is coupled through a front output shaft 44 and a set of Cardan joints 46 to a front differential 48. The differential 48 drivingly engages front axial shafts 50 for positively driving the front wheels 12 through selectively engagable hub locks 52.

Referring now more particularly to FIG. 2, the housing 22 of the transfer case 20 defines interior walls 54 to which an interior ring gear 56 is fixed. Rotatably mounted within the interior ring gear is a planetary gear reduction unit 57 which includes a set of planetary gears 62 adapted to engage the interior ring gear 56.

Those skilled in the art will appreciate that the journaled end 19 of the transmission input shaft 18 comprises an internally splined shaft aperture 58 as well as an exterior sun gear 60, concentrically positioned about the shaft aperture 58. The planetary gears 62 also engage the sun gear 60, whereby the journaled end 19 of the input shaft 18 is rotatably piloted within the planetary gears 62, and ultimately within the ring gear 56.

The planetary gears 62 are carried by a conventional planetary carrier 64. The carrier 64 has an internally splined carrier aperture 66 which is axially offset from the splined aperture 58 but equal thereto in diameter, so as to be selectively engagable by a set of exterior splines 74 on a shifting sleeve 70. The shifting sleeve 70 has a first end 72 which defines a set of exterior splines which engage mating interior splines 124 of the journaled shaft end 25. The opposite end 76 of the shifting sleeve contains the exterior splines 74, adapted to selectively mesh with either the splined aperture 58 for high speed range gear operation, or with the splined aperture 66 for low speed range operation. An electromagnetic apparatus 80 functions as a gear shifting actuator to shift the sleeve 70 from one speed position to the other against the bias of a spring 82 seated against a radial spring seat 78 within a bore 122 of the journaled end 25. The operative biasing end of the spring directly engages the splined end 72 of the shifting sleeve 70. The spring is shown in its operative fully extended condition above the axis "a—a". Below the axis "a—a", the spring is shown compressed under force of the actuated electromagnetic apparatus 80.

The apparatus 80 includes a toroidal-shaped electromagnet 84 which surrounds a minor diameter portion 67 of the shifting sleeve 70. The latter minor diameter portion 67 of the sleeve, which contains the first end 72 of the sleeve, extends through an aperture 86 in the electromagnet 84, symmetrically along the axis "a—a". A larger, major diameter portion 68 of the sleeve, which contains the noted exterior splines 74, defines the opposite or second end 76 of the sleeve 70. A radially inwardly curved neck 69 joins the portions 67 and 68 of the sleeve 70.

A magnetic flux-reactive armature 88 is press-fitted over the minor diameter portion 67 of the sleeve and mounted securely against the neck 69 of the sleeve in the embodiment shown. The armature 88 includes an axially extending inner pole ring 90 and a concentrically positioned axially extending outer pole ring 92, the latter rings being integrally fixed to a radially support ring 94, thus providing a magnetic flux path for approximately 180 degrees of travel about the electromagnet 84. The remainder of the flux path is carried by a field shell 110 which entirely encases the electromagnet 84 except for a single exposed planar surface 85 facing the armature. The field shell contains corresponding inner pole and outer pole rings, 112 and 114, respectively, joined together by a radially extending shell support member 111 fixed by bolts 113 to the internal end wall 129.

The present invention also contemplates the use of mating frustoconical surfaces on corresponding pole rings for achieving an angularly inclined air gap 120 to maximize electromagnetic pull forces on the armature 88. The frustoconical surfaces may be in the corresponding inner pole rings 90 and 112 and/or in the corresponding outer pole rings 92 and 114. In the present embodiment the frustoconical surfaces are at 116 in the outer pole ring 114 of the field shell and at 118 in the outer pole ring 92 of the armature. As noted earlier, the sleeve 70 is in the leftmost, or high gear position whenever the armature is de-energized. At this position the gap 120 is the greatest between the latter frustoconical surfaces 116 and 118. Upon energizing the electromagnet 84, the armature is attracted to the electromagnet by means of the magnetic flux path generated between the armature and the field shell. The use of a frustoconical geometry affords radial as well as axial flux force components for more efficient (hence requiring less energy) operation over wider gaps. This phenomena will readily be appreciated by those skilled in the art, and thus requires no lengthy explanation here.

Another feature of the present invention relates to piloting the second end 76 of the shifting sleeve 70. For this purpose, a conical support member 96 is located within the journaled end 19 of the transmission input shaft 18, concentric to the shaft aperture 58. An apex 98, defined by the narrow-most end 100 of the member 96, is effective to cradle the major diameter portion 68 of the shifting sleeve 70 securely within the end 19, particularly for periods when the splines 74 are between shifts, hence disengaged from either the shaft aperture 58 or the carrier aperture 66. The support member 96 is preferably made of a plastic member, such as a nylon-filled plastic or teflon, which does not require significant lubrication. It will be apparent that the circular base 102 of the member 96 defines a cylindrical exterior surface 99 which will always be in contact with the cylindrical interior 71 of the major diameter portion 68 of the shifting sleeve 70 to securely pilot the sleeve between shifts. It will also be apparent that the bottom 103 of the circular base 102 will be effective to provide a limit to leftward movement of the shifting sleeve 70 via contact of the bottom 103 thereof against the neck 69 of the sleeve 70. Conversely, a radial detent 104, positioned within the bore 122 of the journaled end 25, will be effective to limit the rightward movement of the shifting sleeve 70. For this purpose, movement of the first end 72 of the sleeve will be arrested by the detent 104 formed at the extremity of the interior splines 124 which mate with the splines 72.

A presently preferred embodiment of the invention contemplates use of an air gap 120 having a maximum surface-to-surface spacing of approximately one-hundred thousands of an inch in high range position and a minimum of twenty to forty thousands of an inch in low range position. The magnet, is sized such that, at approximately 22 amps, a 40 pound pull force against the armature 88 can be generated with a twelve volt battery (not shown). Maximum amperage would preferably occur at the beginning of the shift of the armature toward the electromagnet, but then would be decreased electronically to lower values, for example, 6 amps, to maintain the armature in place in the low range shift mode. Use of a reduced operating amperage will minimize operating temperature of the electromagnetic apparatus during extended low range operation. Generally, once the armature has moved close to the magnet, very low amperage is required to maintain sufficient flux across the air gap for maintaining the armature in place. Various electronic circuitry, including microprocessors, may be utilized for control of amperage levels through the electromagnet.

Finally, to the extent that the armature and shifting sleeve are fixed together and operate as a unit, it will be appreciated by those skilled in the art that armature movement, which occurs upon energizing the electromagnet, will always be against the bias of the spring 82. In the event of power failure, the embodiment described is designed to fail in a high range speed gear position. Thus, upon failure of the electromagnetic apparatus 80, the spring 82 will be effective to shift the sleeve 70 into the high range position.

Although only one preferred embodiment has been detailed and described herein, the following claims are envisioned to cover numerous additional embodiments which will fall within the spirit and scope thereof.

What is claimed is:

1. In a speed change mechanism including a housing, said housing comprising interior walls including an interior ring gear fixed thereto, said ring gear defining an axis, a rotary power input shaft having an end thereof journaled within said housing for rotation within said ring gear, said shaft end defining an exterior sun gear and an internally splined shaft aperture concentrically disposed about said axis, a set of planetary gears in mesh with said sun gear and said ring gear, a planetary carrier supporting said set of planetary gears for movement of said carrier about said axis, said carrier defining an internally splined aperture axially spaced from said splined shaft aperture, a rotary output shaft having an end thereof journaled within a second end wall of said housing, said end of said output shaft sharing said axis but axially spaced from said end of said input shaft in end-to-end relation therewith, and a shifting sleeve for changing speed of said output shaft, said sleeve having a first end splined to said output shaft, said sleeve having exterior splines at its opposite end adapted for axial translation of said sleeve for selective engagement of said exterior splines with said shaft aperture or with said carrier aperture; an improvement comprising an electromagnetic apparatus for shifting said sleeve from a first speed change position to a second.

2. The electromagnetic apparatus of claim i for shifting said sleeve, wherein said output shaft includes a radial surface, said apparatus further comprising a spring disposed between said radial surface and said splined first end of said sleeve for shifting said sleeve from said second speed change position back to said first.

3. The electromagnetic apparatus of claim 2 further comprising an electromagnet fixed to said housing, said electromagnet defining an axially aligned aperture for passage of said shifting sleeve, said apparatus further including an armature defining inner and outer axially extending, radially spaced pole rings affixed to and supported by a radially extending support ring, said armature fixed to said sleeve for rotation with said sleeve about said electromagnet, whereby upon selectively energizing said electromagnet, said armature ring is axially drawn toward said electromagnet against the bias of said spring; then is biased away from said electromagnet by said spring when said electromagnet is de-energized.

4. The apparatus of claim 3 wherein said first end of said sleeve comprises a minor diameter portion, said second end of said sleeve comprises a larger, major diameter, portion, said sleeve further defining a radially inwardly curved neck between major and minor portions, said apparatus further comprising means for piloting said major diameter portion of said sleeve within said journaled end of said input shaft.

5. The apparatus of claim 4 wherein said means for piloting said major diameter portion of said sleeve comprises a conical support member defining an apex at its narrow-most end, and having a circular base defining its bottom extremity, said apex adapted for symmetrical support of the major sleeve portion within said end of said input shaft along said axis, the base of said support member adapted to contact said neck of said sleeve upon engagement of said exterior splines of said sleeve with said shaft aperture, whereby said base comprises an axial shift limit of said sleeve movement when said sleeve is biased by said spring force.

6. The apparatus of claim 5 wherein said output shaft comprises a radially extending detent adapted for engagement of said first end of said sleeve upon engagement of said first end of said sleeve upon engagement of said exterior splines of said sleeve with said carrier aperture, whereby said detent comprises a shift limit for movement of said sleeve when said electromagnet is energized.

7. The apparatus of claim 6 wherein said electromagnet is fixedly supported within a field shell, said shell defining radially spaced inner and outer pole rings positioned between and disposed in radially spaced relation with said inner and outer pole rings of said armature, wherein said respective inner pole rings are in radial concentric proximity with one another, while said respective outer pole rings are in radial concentric proximity with one another, at least one of said pole rings of said armature and said corresponding pole ring of said field shell having frustoconical surfaces which define an air gap, whereby as said armature is axially drawn toward said electromagnet against the bias of said spring, said air gap between said surfaces progressively becomes smaller in response to both radial as well as axial magnetic flex force components between said frustoconical surfaces.

8. The apparatus of claim 7 wherein said first end of said sleeve comprises external splines, an end of said output shaft comprises a bore having interior splines, and said radial surface of said output shaft is positioned within said bore, whereby said spring is axially retained within said bore.

9. The apparatus of claim 8 wherein engagement of said exterior splines of said sleeve with said shaft aperture comprises a high range gear position, and wherein engagement of said exterior splines with said carrier aperture comprises a low range gear position, whereby upon failure of said electromagnetic apparatus, said spring is effective to shift said sleeve into said high gear position.

10. The apparatus of claim 9 wherein said conical support member comprises a non-metallic material.

* * * * *